Nov. 10, 1953
G. L. DU ROSTU
2,658,491
COOLING AND LUBRICATING ARRANGEMENT FOR VALVE
GUIDES AND STEMS OF THERMAL ENGINES
Filed Nov. 28, 1950
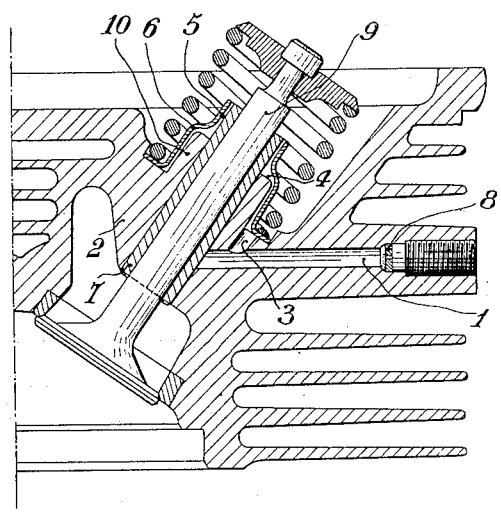
Inventor
Georges Levesque du Rostu
By Robert E. Burns
Attorney Patented Nov. 10, 1953

2,658,491

UNITED STATES PATENT OFFICE 2,658,491

COOLING AND LUBRICATING ARRANGEMENT FOR VALVE GUIDES AND STEMS OF THERMAL ENGINES

Georges Levesque Du Rostu, Paris, France, assignor to Societe Anonyme Andre Citroen, Paris, France Application November 28, 1950, Serial No. 197,853

Claims priority, application France November 30, 1949

1 Claim. (Cl. 123—188)

This invention relates to the cooling and lubrication of valve guides and stems of thermal engines and more particularly of internal combustion engines.

The object of this invention is to provide a novel arrangement permitting of cooling and lubricating engine valves and valve guides, and more particularly exhaust valves, with the assistance of the oil fed from the lubrication system of the engine.

This object is attained by drilling a bore close to the boss normally provided in the cylinder head for inserting therein the valve guide, this bore being connected on the one hand through a passage formed in the cylinder head with a pipe fed from the lubrication system of the engine and, on the other hand, directly with a cap member covering the assembly formed by the boss and the outer end of the valve guide while forming an annular space thereabout which communicates directly with the inside of the engine.

The oil supply pipe is provided with a suitable feed regulator so that lubricating oil will constantly fill the cap member and therefore cool the valve guide while being subsequently sprinkled onto the valve stem. The main advantages of the arrangement according to this invention may be summed up as follows:

(a) The cooling of the valve guide and stem reduces materially the wear of these members because the resistance to wear of the materials currently used in the production of valve guides, for instance, is seriously affected by operation at high temperatures;

(b) Valve stem "sticking" in the valve guide is substantially reduced;

(c) Valve tightness to gases is materially improved and lasts longer.

In the annexed drawing forming part of this specification, there is illustrated diagrammatically by way of example one embodiment of the invention is applied to an air-cooled internal combustion engine of which a detail is shown in cross-section. The example of an air-cooled engine has been illustrated because valve stem lubrication and cooling is a much more difficult problem in air-cooled than liquid-cooled engines.

In the arrangement illustrated, a passage 1 drilled through the cylinder head is connected with the lubrication system of the engine whereby the oil under pressure fed by the pump may flow in an amount metered by a suitable device (for instance a feed regulator 8) through a hole 3 into a cap member 6 so as to fill the annular space 4, 5 formed between a boss 10 of valve guide 7, the inner wall of cap member 6 and the external cylindrical wall of the outer end of valve guide 7. From this space 4, 5 the oil spills back to the lower portion of the sump-forming engine crankcase where it is sucked up by the oil pump for re-cycling through the engine oiling system.

In addition to its cooling property the oil escaping from the annular space 5 acts also as a lubricant by maintaining a film of oil on the valve stem 9 whereby some oil will penetrate between the valve stem 9 and valve guide 7 to assure a slight lubrication of these parts and therefore reduce their wear.

While the example described and illustrated refers only to one embodiment of the invention, it will be readily understood by those conversant with the art that many modifications as to shapes and dimensions may be brought thereto without departing from the spirit and scope of the invention.

What I claim is:

In a thermal engine having a pressure feed device for delivering lubricating and cooling oil, a cylinder block and a cylinder-head and valves, said cylinder-head being formed with bosses, and guides fitted in said bosses for receiving the stems of said valves, the arrangement for cooling and lubricating said valve stems which comprises a cap member providing an annular space surrounding each of said boss and guide assemblies, said cap member being open at its outer end, a duct formed in the cylinder head and connected directly to said space at the bottom of said cap member for feeding lubricating and cooling oil from said pressure feed device to said space.

GEORGES LEVESQUE DU ROSTU.

References Cited in the file of this patent

UNITED STATES PATENTS

| Number | Name | Date |
|---|---|---|
| 1,403,540 | Church | Jan. 17, 1922 |
| 2,112,045 | Puffer | Mar. 22, 1938 |

FOREIGN PATENTS

| Number | Country | Date |
|---|---|---|
| 548,101 | Great Britain | Sept. 24, 1942 |